J. J. HESSE.
RESILIENT WHEEL.
APPLICATION FILED FEB. 21, 1912.
1,134,199.
Patented Apr. 6, 1915.
2 SHEETS—SHEET 1.
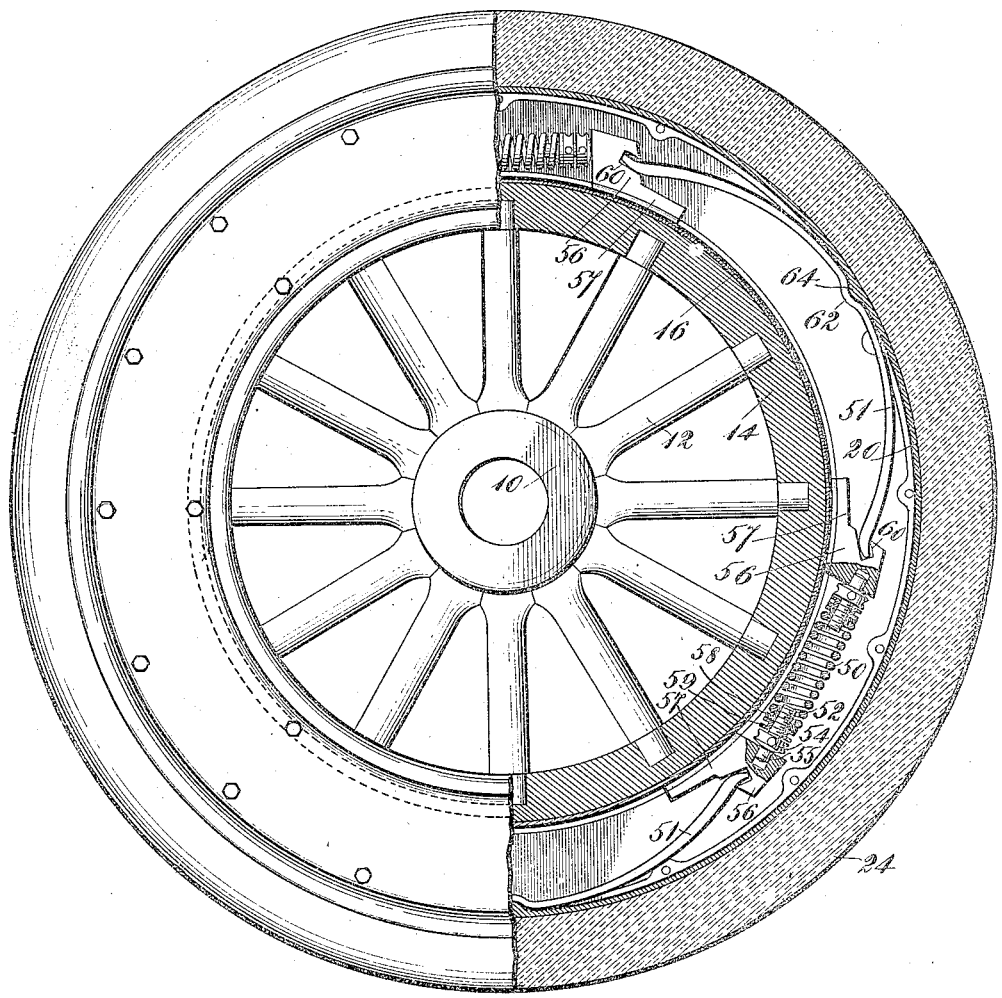
Fig-1-

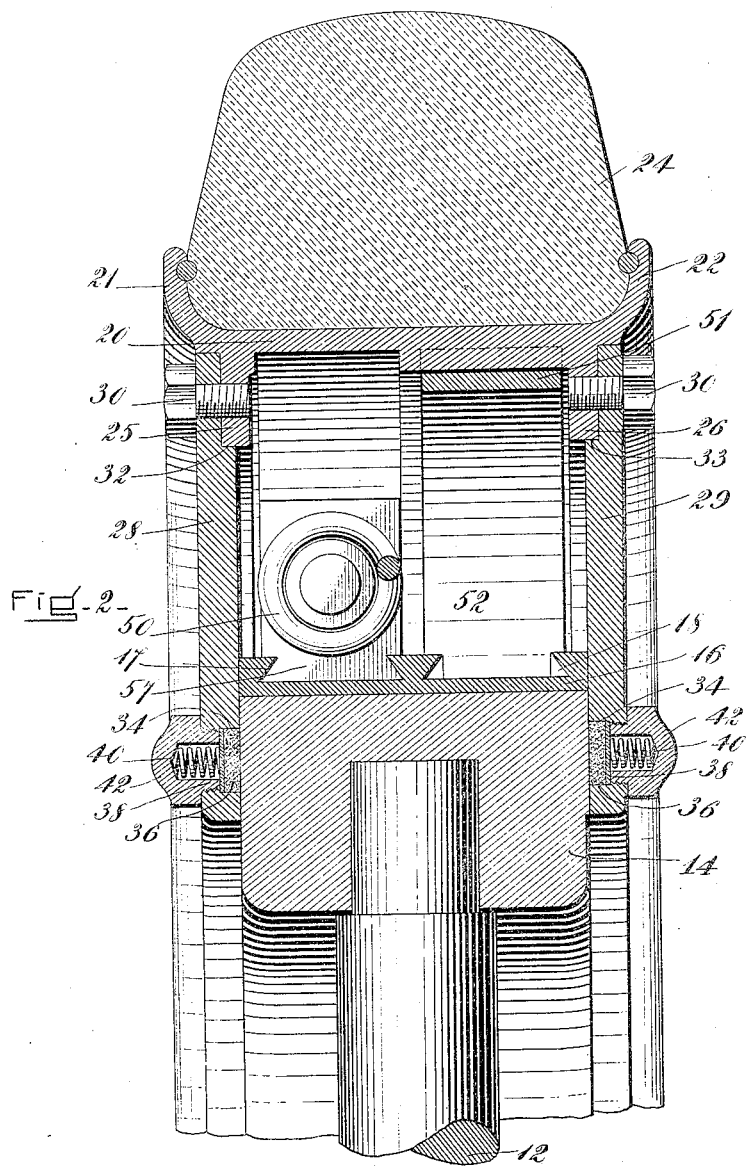

UNITED STATES PATENT OFFICE.

JOHN J. HESSE, OF BOSTON, MASSACHUSETTS, ASSIGNOR OF ONE-HALF TO WILLIAM A. CONNELLY, OF BOSTON, MASSACHUSETTS.

RESILIENT WHEEL.

1,134,199.            Specification of Letters Patent.      Patented Apr. 6, 1915.

Application filed February 21, 1912. Serial No. 679,021.

*To all whom it may concern:*

Be it known that I, JOHN J. HESSE, of Boston, in the county of Suffolk and State of Massachusetts, have invented certain new and useful Improvements in Resilient Wheels, of which the following is a specification.

This invention relates to an improvement in resilient wheels, and has for its object to provide a wheel which is simple in construction, durable and efficient in operation, and one in which the use of the usual pneumatic tires is eliminated, but with satisfactory results.

Accordingly, a feature of the invention contemplates the provision of a plurality of bowed springs and a plurality of coiled springs alternating with each other and arranged circumferentially within the wheel, and means for adjusting the same to any desired degree of tension.

With the above and other objects in view, the invention consists in the resilient wheel hereinafter described and particularly defined in the claims, the advantages of which will be obvious to those skilled in the art from the following detailed description.

In the accompanying drawings, Figure 1 is a side elevation, partly in section, of an illustrative embodiment of the invention, and Fig. 2 is a transverse vertical section, on an enlarged scale, of the rim and tire of the wheel.

As illustrated in the drawings, the wheel comprises a hub 10, spokes 12, and a felly 14, all of which may be of any usual or desired construction. A steel band or rim 16 is affixed to the external periphery of the felly, and is provided with a pair of dove-tail peripheral channels or grooves 17, 18. Although two such channels are shown, it should be understood that any desired number may be employed.

The tire of the wheel comprises an annular rim 20, having external flanges 21, 22, adapted to hold a rubber or other tire 24 in place. The shape and size of the tire may be varied according to requirements. The rim 20 is provided with a pair of internal flanges 25, 26, to which annular side plates 28, 29, respectively, are attached by bolts or cap screws 30. The side plates 28, 29 are preferably formed with shoulders 32, 33, which engage the inner peripheries of the flanges 25, 26, respectively. The inner flat faces of said side plates are adapted to slidably engage the outer flat faces of the felly 14 and the rim 16, and are preferably provided with annular grooves 34, which contain rings of packing material 36, to prevent access of dirt to the interior of the spring chamber. This packing material may be held against the wheel faces by metal rings 38, which are pressed in by springs 40 held within caps 42, the latter being threaded into the side plates 28, 29.

The wheel felly and rim 14, 16, together with the rim 20 and the side plates 28, 29, form an annular closed chamber within which the springs are inclosed. In the present embodiment of the invention there are two circumferential series of springs, each series consisting of three coiled springs 50 and three bowed springs 51, the coiled springs of one series being located opposite the bowed springs of the other series, or, in other words, the two kinds of springs are distributed over the rim 16 in staggered relation. Although each series is shown as composed of three springs of each kind, it should be understood that any desired number may be employed, without departing from the scope of the invention.

Projecting into each end of a coiled spring 50 is the threaded stem of a capstan screw 52, having a head 54 and trunnion 55, the latter being journaled in a block 56 having a dove-tail base 57 slidably fitting one of the grooves 17, 18. A nut 58 is threaded on the stem of the screw 52, and a check or lock nut 59 is also threaded on said stem between the nut 58 and the head 54. The heads 54 and nuts 59 are provided with radial holes into which a pin may be inserted to turn the screws 52 and nuts 59.

The bowed springs 51 have their ends held in recesses 60 provided in the outer end faces of the blocks 56, and their central portions may be formed with a depression 62 adapted to fit a correspondingly shaped lug 64 on the inner periphery of the rim 20, to keep the springs from creeping on the inner face of the outer rim. Any suitable connection, not shown, may be provided between the wheel and tire to form a driving connection between the same.

By turning the heads 54 of the screws 52 the blocks 56 may be forced apart to expand the bowed springs 51, and the nuts 58 engage the ends of the coiled springs 50, the whole system of springs being in this way adjustable to provide the desired tension around the entire periphery of the wheel. When the desired tension has been obtained the lock nuts 59 are set up against the nuts 58 to secure the springs in adjusted position.

While I have illustrated and described a preferred embodiment of the invention, I am aware that many modifications can be made therein by any person skilled in the art without departing from the scope of the invention as expressed in the claims. Therefore, I do not wish to be limited to all the details of construction shown and described, but

What I claim is:—

1. A resilient wheel, comprising an inner rim and an outer rim, a plurality of coiled springs and a plurality of bowed springs arranged alternately circumferentially, and means located between each end of each bowed spring and the opposing end of each coiled spring for varying the compression of said springs.

2. A resilient wheel comprising an inner rim and an outer rim, a circumferential series of alternately bowed springs and coiled springs located between said rims, a block interposed between the adjacent ends of each of said bowed and coiled springs, respectively, and means carried by said blocks for varying the pressure on all of said springs longitudinally thereof.

3. A resilient wheel, comprising an inner rim and an outer rim, a plurality of coiled springs, a block at each end of each of said coiled springs, said blocks being provided with notches on their outer faces, a plurality of bowed springs alternating with said coiled springs and having their ends held in said notches, and adjustable means for exerting pressure between the coiled and bowed springs.

4. A resilient wheel, comprising an inner rim and an outer rim, a plurality of coiled springs, a block at each end of each coiled spring, a bowed spring between each pair of coiled springs having its ends mounted in a pair of said blocks, and means carried by said blocks for varying the pressure upon said springs.

5. A resilient wheel, comprising an inner rim and an outer rim, said inner rim being provided with a peripheral groove, a plurality of coiled springs, a block at each end of each of said springs and held in said groove, a plurality of bowed springs bearing against the interior of said outer rim and having their ends held in said blocks, and screws carried by said blocks for adjusting the compression of said springs.

6. A resilient wheel, comprising an inner rim and an outer rim, said inner rim being provided with a peripheral channel, a plurality of coiled springs, a block at each end of each of said springs arranged to slidably fit said channel, said blocks being provided with notches on their outer end faces, a plurality of bowed springs bearing against said outer rim located between each pair of coiled springs and having their ends held in the recesses of opposed blocks, and screws carried by said blocks for adjusting the compression of said springs.

7. A resilient wheel, comprising an inner rim and an outer rim, a circumferential series of springs composed of bowed springs and coiled springs arranged alternately around the inner rim, blocks slidable on said inner rim, and adjustable means carried by said blocks for exerting pressure upon the ends of said springs.

In testimony whereof I have affixed my signature, in presence of two witnesses.

JOHN J. HESSE.

Witnesses:
 CHARLES E. DOW,
 WILLIAM S. CONNELLY.